No. 731,982. PATENTED JUNE 23, 1903.
J. F. VALENTINE.
APPARATUS FOR DISINFECTING AND FUMIGATING.
APPLICATION FILED FEB. 24, 1902.
NO MODEL.
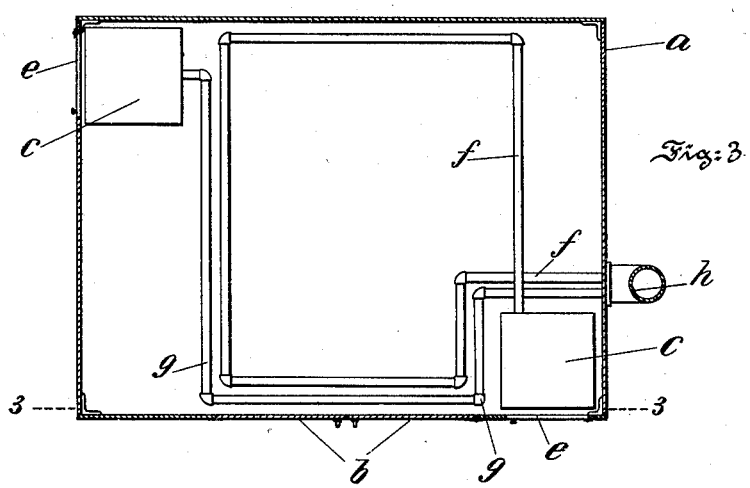
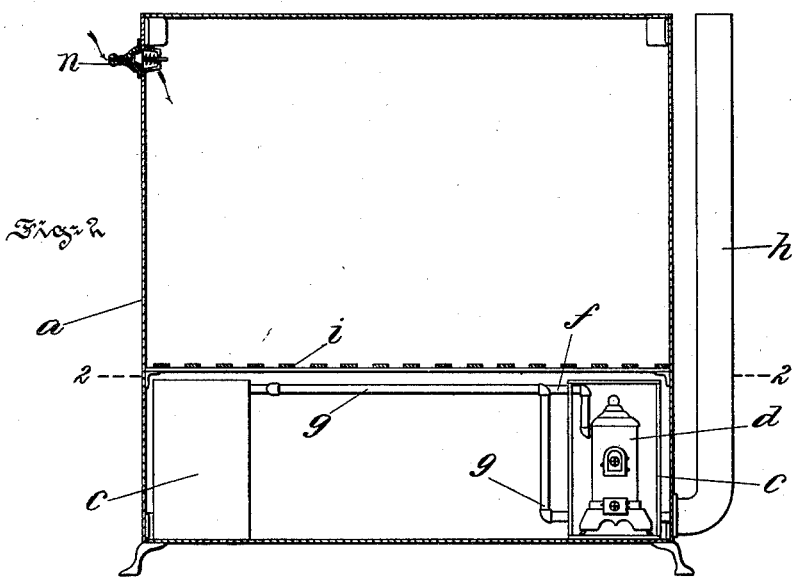
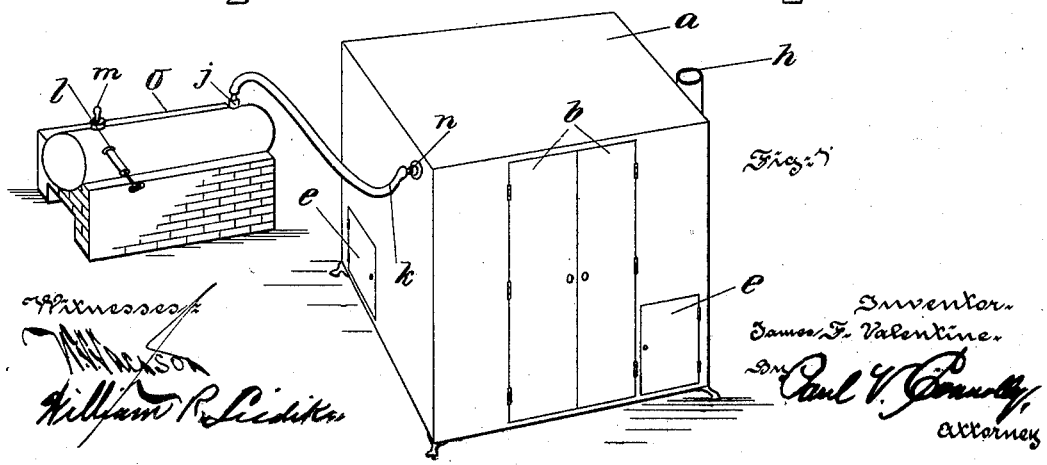

No. 731,982. Patented June 23, 1903.

UNITED STATES PATENT OFFICE.

JAMES F. VALENTINE, OF PHILADELPHIA, PENNSYLVANIA.

APPARATUS FOR DISINFECTING AND FUMIGATING.

SPECIFICATION forming part of Letters Patent No. 731,982, dated June 23, 1903.

Application filed February 24, 1902. Serial No. 95,268. (No model.)

*To all whom it may concern:*

Be it known that I, JAMES F. VALENTINE, a citizen of the United States, residing at the city of Philadelphia, in the county of Philadelphia, State of Pennsylvania, have invented a certain new and useful Apparatus for Disinfecting and Fumigating Purposes, of which the following is a specification.

My invention has relation to apparatus for disinfecting and fumigating, and has for its object the provision of means for disinfecting and fumigating articles which require such treatment by means of heated and vitiated air; and my invention consists in the novel construction, combination, and arrangement of parts hereinafter described and claimed.

In the accompanying drawings, illustrating my improvement, Figure 1 is a perspective view of the complete apparatus; Fig. 2, a vertical sectional view of a cabinet in which the articles to be treated are kept during the time they are being disinfected and fumigated, and Fig. 3 is a horizontal sectional view of the same.

The apparatus which constitutes my invention consists of a cabinet $a$, having doors $b$, by means of which access is had to the interior of the cabinet, and shelves or gratings $i$, upon which are placed the articles to be treated.

Within the cabinet $a$ is arranged a drum or casing $c$, which covers and incloses a stove or other fuel-burning apparatus $d$, from which a pipe $f$ leads through the wall of the drum or casing $c$ and after passing around through the cabinet beneath the grating $i$ leads to an offtake or chimney $h$.

In the drawings I have shown two drums or casings $c$, each of which can contain a fuel-burning device, with smoke-pipes leading to the offtake or chimney $h$; but one such fuel-burning device will generally be found sufficient.

The drums or casings $c$ are arranged close to the wall of the cabinet $a$, and doors $e$ in the cabinet permit of access to the fuel-burning devices within the drums or casings $c$ without entering the cabinet. The drums or casings are open on one side next to the doors $e$, and the air within the cabinet is thus permitted to enter the drums or casings to supply oxygen to the fuel-burning devices, and in like manner a part of the vitiated air which has passed through the stove and a part of the products of combustion escape from the fuel-burning device and pass out of the drums or casings into the interior of the cabinet. In place of having the side of the drum or casing open, as above described, I can and prefer to arrange the drums or casings with the open side against the wall of the cabinet and to form openings in the sides of the drums or casings with doors which can be operated from outside the cabinet by suitable rods projecting through the walls of the cabinet, so that the entrance of air from the cabinet to the drums or casings and the escape of vitiated air and gases generated by combustion can be regulated and controlled from outside the cabinet.

In Fig. 1 of the drawings I have shown a modification of the apparatus shown in Figs. 2 and 3, comprising in addition to the cabinets shown in Figs. 2 and 3 a retort or air-heating vessel $o$, having an intake-valve $m$, a pump $l$, a coupling $j$, and a pipe $k$, leading to an inwardly-opening valve $n$ in the wall of cabinet $a$. The retort or air-heating vessel $o$ is mounted on a suitable supporting structure and arranged so that a fire may be kept burning under it to heat the air, and when it is desired to force heated air from the retort $o$ into the cabinet the pump $l$ is operated and fresh air drawn into the retort, while the heated air is forced into the cabinet.

The operation of the apparatus is as follows: The articles to be disinfected and fumigated having been placed on the shelves or gratings $i$ and the doors $b$ and $e$ tightly closed, the air within the cabinet will become heated and will become vitiated and impregnated with carbon dioxid and escaping into the drums or casings $c$ $c$ through the various interstices and joints of the fuel-burning devices will find its way into the cabinet, and by the action of the heat and the gases with which the vitiated air is impregnated the articles in the cabinet will be effectually disinfected and fumigated. The grosser products of combustion will be conveyed from the fuel-burning devices to the chimney by the pipes $f$ and $g$, thus preventing the soiling of the articles within the cabinet.

When an additional supply of air is required, it may be supplied in a heated condition from the retort shown in Fig. 1.

Having described my invention, I claim—

1. In a disinfecting and fumigating apparatus, the combination of a closed cabinet adapted to contain the articles to be treated, a casing arranged within said cabinet and having an opening communicating with the interior of the cabinet, a door in the cabinet affording access to the interior of the casing, a fuel-burning device arranged within said casing, said fuel-burning device being provided with doors which may be opened or closed within the casing to regulate the escape of gases into the casing and with a smoke-pipe leading outside the cabinet, substantially as described.

2. In a disinfecting and fumigating apparatus, the combination with a cabinet adapted to contain the articles to be treated, a casing arranged within the cabinet and having an opening in one of its sides communicating with the interior of the cabinet, a fuel-burning device in said casing, a pipe leading from said fuel-burning device to the exterior of the cabinet and through the same, of a supplementary air-heating apparatus arranged outside the cabinet and means for forcing heated air from said supplementary air-heating apparatus to the interior of the cabinet, substantially as described.

In testimony whereof I have affixed my signature in the presence of two witnesses.

JAMES F. VALENTINE.

Witnesses:
  W. J. JACKSON,
  WILLIAM R. LIEDIKE.